(12) United States Patent
Lambourne et al.

(10) Patent No.: US 10,691,325 B2
(45) Date of Patent: *Jun. 23, 2020

(54) USER INTERFACE FOR SCROLLING THROUGH A LARGE LIST OF ITEMS

(71) Applicant: Sonos, Inc., Santa Barbara, CA (US)

(72) Inventors: Robert A. Lambourne, Santa Barbara, CA (US); Steve Holmgren, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 15/331,368

(22) Filed: Oct. 21, 2016

(65) Prior Publication Data

US 2017/0038936 A1 Feb. 9, 2017

Related U.S. Application Data

(63) Continuation of application No. 14/178,871, filed on Feb. 12, 2014, now Pat. No. 9,507,505, which is a (Continued)

(51) Int. Cl.
*G06F 3/048* (2013.01)
*G06F 3/0485* (2013.01)
(Continued)

(52) U.S. Cl.
CPC .......... *G06F 3/0485* (2013.01); *G06F 3/0482* (2013.01); *G06F 3/04855* (2013.01);
(Continued)

(58) Field of Classification Search
CPC .... G06F 3/0481; G06F 16/41; G06F 16/4387; G06F 3/0482; G06F 16/639; G06F 16/951; G06F 3/04817; G06F 3/162; G06F 3/165
See application file for complete search history.

(56) References Cited

U.S. PATENT DOCUMENTS

| | | | |
|---|---|---|---|
| 5,440,644 A | | 8/1995 | Farinelli et al. |
| 5,745,716 A | * | 4/1998 | Tchao .................. G06F 3/0483 715/777 |

(Continued)

FOREIGN PATENT DOCUMENTS

| | | |
|---|---|---|
| EP | 1389853 A1 | 2/2004 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Linh K Pham
(74) *Attorney, Agent, or Firm* — McDonnell Boehnen Hulbert & Berghoff LLP

(57) ABSTRACT

Techniques pertaining to efficient scrolling are disclosed. One of the features of the efficient scrolling is the enablement of a search right at an appropriate item in a large list of items, thus avoiding going through the long list and wandering back and forth around a desired item. According to one embodiment, an indexing display is used. The indexing display includes a list of indexes, each corresponding to a group of items that sharing one or more common characteristics (e.g., a character or a kind). The indexing display is allowed first to be scrolled for a desired index. Once the desired index is confirmed, searching for a desired item in the large list starts at an item indexed by the desired index.

20 Claims, 6 Drawing Sheets

Related U.S. Application Data continuation of application No. 11/382,272, filed on May 9, 2006, now Pat. No. 8,694,910.

(51) Int. Cl.
*G06F 3/0482* (2013.01)
*G06F 3/16* (2006.01)
*G06F 3/0481* (2013.01)

(52) U.S. Cl.
CPC .............. *G06F 3/162* (2013.01); *G06F 3/165* (2013.01); *G06F 3/04817* (2013.01)

(56) References Cited

U.S. PATENT DOCUMENTS

| | | | |
|---|---|---|---|
| 5,761,320 | A | 6/1998 | Farinelli et al. |
| 5,848,410 | A | 12/1998 | Walls et al. |
| 5,859,638 | A | 1/1999 | Coleman et al. |
| 6,025,838 | A | 2/2000 | Bardon et al. |
| 6,032,202 | A | 2/2000 | Lea et al. |
| 6,288,718 | B1 | 9/2001 | Laursen et al. |
| 6,469,633 | B1 | 10/2002 | Wachter |
| 6,778,869 | B2 | 8/2004 | Champion |
| 6,971,069 | B2 | 11/2005 | Laiho et al. |
| 7,295,548 | B2 | 11/2007 | Blank et al. |
| 7,305,624 | B1 | 12/2007 | Siegel |
| 7,483,538 | B2 | 1/2009 | McCarty et al. |
| 7,545,440 | B2 | 6/2009 | Kim et al. |
| 7,560,637 | B1 | 7/2009 | Robbin et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,788,582 | B2 | 8/2010 | Robbin et al. |
| 7,853,341 | B2 | 12/2010 | McCarty et al. |
| 7,890,520 | B2 | 2/2011 | Tsukazaki et al. |
| 7,956,272 | B2 | 6/2011 | Wysocki et al. |
| 7,958,456 | B2 | 6/2011 | Ording et al. |
| 7,987,294 | B2 | 7/2011 | Bryce et al. |
| 8,017,852 | B2 | 9/2011 | Yamashita et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,276,076 | B2 | 9/2012 | Torrens et al. |
| 8,483,853 | B1 | 7/2013 | Lambourne |
| 8,634,944 | B2 | 1/2014 | Bull et al. |
| 8,683,378 | B2 | 3/2014 | Bull et al. |
| 8,694,910 | B2 | 4/2014 | Lambourne et al. |
| 8,766,079 | B2 | 7/2014 | Utsuki et al. |
| 8,954,855 | B2 | 2/2015 | Shirai et al. |
| 8,977,963 | B1 | 3/2015 | Joyce et al. |
| 2001/0026287 | A1* | 10/2001 | Watanabe ............... G06F 21/10 715/764 |
| 2002/0124097 | A1 | 9/2002 | Isely et al. |
| 2002/0147977 | A1 | 10/2002 | Hammett et al. |
| 2003/0013493 | A1 | 1/2003 | Irimajiri et al. |
| 2004/0100479 | A1 | 5/2004 | Nakano et al. |
| 2004/0113952 | A1 | 6/2004 | Randall |
| 2004/0252119 | A1 | 12/2004 | Hunleth et al. |
| 2005/0154988 | A1 | 7/2005 | Proehl et al. |
| 2006/0026535 | A1 | 2/2006 | Hotelling et al. |
| 2006/0036942 | A1 | 2/2006 | Carter et al. |
| 2006/0095848 | A1 | 5/2006 | Naik |
| 2006/0123357 | A1 | 6/2006 | Okamura |
| 2006/0156239 | A1 | 7/2006 | Jobs et al. |
| 2006/0161870 | A1 | 7/2006 | Hotelling et al. |
| 2006/0161871 | A1 | 7/2006 | Hotelling et al. |
| 2006/0184901 | A1 | 8/2006 | Dietz |
| 2006/0218209 | A1 | 9/2006 | Arrouye et al. |
| 2006/0271870 | A1 | 11/2006 | Anwar |
| 2006/0282858 | A1 | 12/2006 | Csicsatka et al. |
| 2007/0016314 | A1 | 1/2007 | Chan et al. |
| 2007/0083822 | A1 | 4/2007 | Robbin et al. |
| 2007/0132789 | A1 | 6/2007 | Ording et al. |
| 2007/0142944 | A1 | 6/2007 | Goldberg et al. |
| 2007/0150830 | A1 | 6/2007 | Ording et al. |
| 2007/0156648 | A1 | 7/2007 | Bridges et al. |
| 2007/0168875 | A1 | 7/2007 | Kowitz et al. |
| 2007/0236475 | A1 | 10/2007 | Wherry |
| 2007/0248311 | A1 | 10/2007 | Wice et al. |
| 2008/0040687 | A1 | 2/2008 | Randall |
| 2011/0143653 | A1 | 6/2011 | Lane et al. |
| 2013/0047087 | A1 | 2/2013 | Yamahara et al. |
| 2013/0198268 | A1 | 8/2013 | Hyman |
| 2013/0198632 | A1 | 8/2013 | Hyman |
| 2015/0149901 | A1 | 5/2015 | Otto et al. |

OTHER PUBLICATIONS

AudioTron Reference Manual, Version 3.0, May 2002, 70 pages.
AudioTron Setup Guide, Version 3.0, May 2002, 38 pages.
Jo et al., "Synchronized One-to-many Media Streaming with Adaptive Playout Control," Proceedings of SPIE, 2002, pp. 71-82, vol. 4861.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Burns; et al., "A Graphical Entity-Relationship Database Browser", 1988, 694-704.
Final Office Action dated Aug. 4, 2010, issued in connection with U.S. Appl. No. 11/832,272, filed May 9, 2006, 17 pages.
Final Office Action dated Mar. 17, 2016, issued in connection with U.S. Appl. No. 14/178,871, filed Feb. 12, 2014, 13 pages.
Final Office Action dated Jul. 18, 2011, issued in connection with U.S. Appl. No. 11/832,272, filed May 9, 2006, 16 pages.
Final Office Action dated Jul. 21, 2009, issued in connection with U.S. Appl. No. 11/832,272, filed May 9, 2006, 12 pages.
Final Office Action dated Oct. 23, 2012, in connection with U.S. Appl. No. 11/832,272, filed May 9, 2006, 19 pages.
Myers; et al., "Taking Handheld Devices to the Next Level", 2002, 36-43.
Non-Final Office Action dated Apr. 7, 2008, issued in connection with U.S. Appl. No. 11/832,272, filed May 9, 2006, 9 pages.
Non-Final Office Action dated Jan. 19, 2011, issued in connection with U.S. Appl. No. 11/832,272, filed May 9, 2006, 16 pages.
Non-Final Office Action dated Dec. 28, 2009, issued in connection with U.S. Appl. No. 11/832,272, filed May 9, 2006, 15 pages.
Non-Final Office Action dated Mar. 28, 2012, issued in connection with U.S. Appl. No. 11/832,272, filed May 9, 2006, 15 pages.
Notice of Allowance dated Nov. 13, 2013, issued in connection with U.S. Appl. No. 11/832,272, filed May 9, 2006, 22 pages.
Notice of Allowance dated Jul. 27, 2016, issued in connection with U.S. Appl. No. 14/178,871, filed Feb. 12, 2014, 8 pages.
Perry; et al., "Of Mice and Menus; Designing the User-Friendly Interface", 1989, 46-51.

* cited by examiner

USER INTERFACE FOR SCROLLING THROUGH A LARGE LIST OF ITEMS

CROSS-REFERENCE TO RELATED APPLICATION

The present application is a continuation of U.S. application Ser. No. 14/178,871 filed on Feb. 12, 2014, titled "User Interface to Enable Users to Scroll Through a Large List of Items," and currently pending. The Ser. No. 14/178, 871 application is a continuation of Ser. No. 11/382,272 filed on May 9, 2006, titled "User Interface to Enable Users to Scroll Through a Large List of Items," and issued as U.S. Pat. No. 8,694,910 on Apr. 8, 2014. The entire contents of the Ser. Nos. 14/178,871 and 11/382,272 applications are incorporated herein by reference for all purposes.

BACKGROUND OF THE INVENTION

Field of the Invention

The invention is generally related to the area of man machine interface. In particular, the invention is related to method and apparatus for effectively scrolling through a large list of items.

The Background of Related Art

The most popular use of a scroll wheel may be probably found on an Apple's iPod. A scroll wheel of an iPod allows a user to scroll where he/she desires. Thus a user can choose songs to play on from lists of artists, albums, composers, genres, or tracks.

The underlying mechanism of a scroll wheel is a software module being executed to convert a physical motion of the user moving his/her finger over the scroll wheel to a highlight bar on a list of music items. The software module is configured based on the concept of 'acceleration'. In simple terms, this means that the faster the user turns the scroll wheel, the faster the list on the screen will scroll. This is very effective in allowing users to traverse long lists.

There are, however, at least two problems observed. First, it still takes a long time to get through a large list of music items. For example, if a desired item is an item No. 1500 in a list of 2000 songs, a user has to go through the first 1499 items before reaching the item No. 1500. Second, when a list is scrolled fast, it is very hard for the user to stop at the desired position without overshooting. For example, If the list is showing an artist named "Abba", and the user wants to scroll to an artist named "Sting", he/she must turn the scroll wheel fast in order to get from Abba to S's quickly. But because the list is long and so being scrolled fast, it is very easy to overshoot the list and get to the T's or U's by moving his/her finger on the scroll wheel too fast.

It is commonly accepted that a scroll wheel is a convenient mechanism to scroll through a list. Thus, there is a need for solutions that can facilitate a user to readily reach to a desired item in a long list.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to power scrolling that facilitates a search right at an appropriate item, thus avoiding going through a long list and wandering back and forth around a desired item. According to one aspect of the present invention, an indexing display is used. The indexing display includes a list of indexes, each corresponding to a group of items sharing one or more common characteristics (e.g., a character or a kind). The indexing display is allowed first to be scrolled for a desired index. Once the desired index is confirmed, searching for a desired item in the large list starts at an item indexed by the desired index.

The present invention may be implemented in many forms including software, hardware or a combination of both as a method and apparatus. According to one embodiment, the present invention is a method for scrolling a large list of items, the method comprises showing an indexing display that includes a list of indexes, each corresponding to a group of items that sharing one or more common characteristics; scrolling in the indexing display for a desired index; and scrolling in the large list when the desired index is confirmed, wherein the scrolling in the large list starts at an item indexed by the desired index.

Depending on implementation, the large list may be sorted or unsorted. Thus the item indexed by the desired index may be a first one of a group of items indexed by the desired index, or a first one in the large list that is indexed by the desired index.

According to another embodiment, the present invention is an apparatus for displaying a list of items, the apparatus comprises: a display screen, a screen driver configured to display the large list on the display screen, a scroll wheel allowing scrolling in the list being displayed, a memory for storing code, a processor executing the code to perform operations of: showing an indexing display that includes a list of indexes, each corresponding to a group of items that sharing one or more common characteristics; scrolling in the indexing display for a desired index; and scrolling in the large list when the desired index is confirmed, wherein the scrolling in the large list starts at an item indexed by the desired index.

One of the objects, features, and advantages of the present invention is to provide solutions of effectively scrolling through a large list of items.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
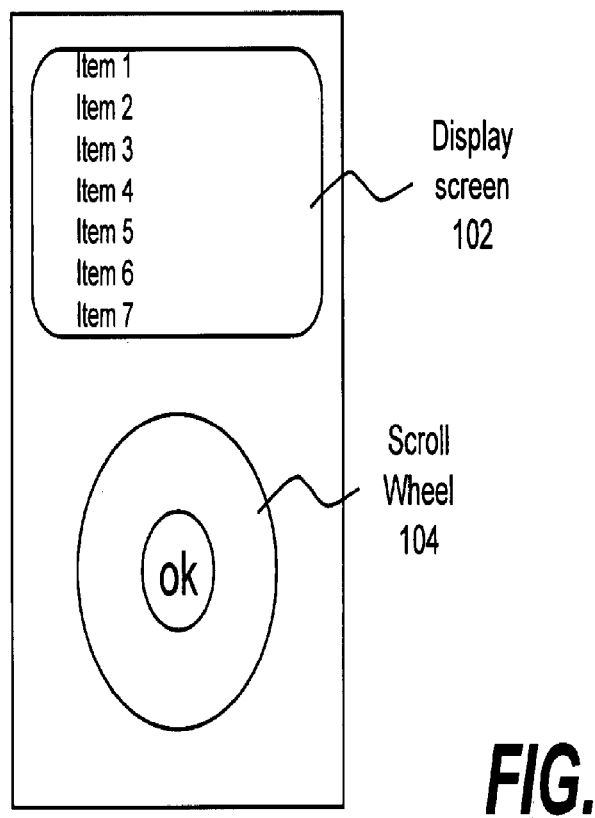
FIG. 1 shows an exemplary configuration in which the present invention may be practiced.

Referring now to the drawings, in which like numerals refer to like parts throughout the several views. FIG. 1 shows a front view of an Apple iPod 100 that includes a display screen 102 and a scroll wheel 104. A user may put a finger on the scroll wheel 104 to navigate a list being displayed in the screen 102 by moving the finger clockwise or counter-clockwise. An acceleration of the finger movement would control a navigating speed of the list. Because the display screen 102 is relatively small, a search of an item down in the list would often overpass the item, resulting in repeated wandering back and forth around the item.

Figure 2A:
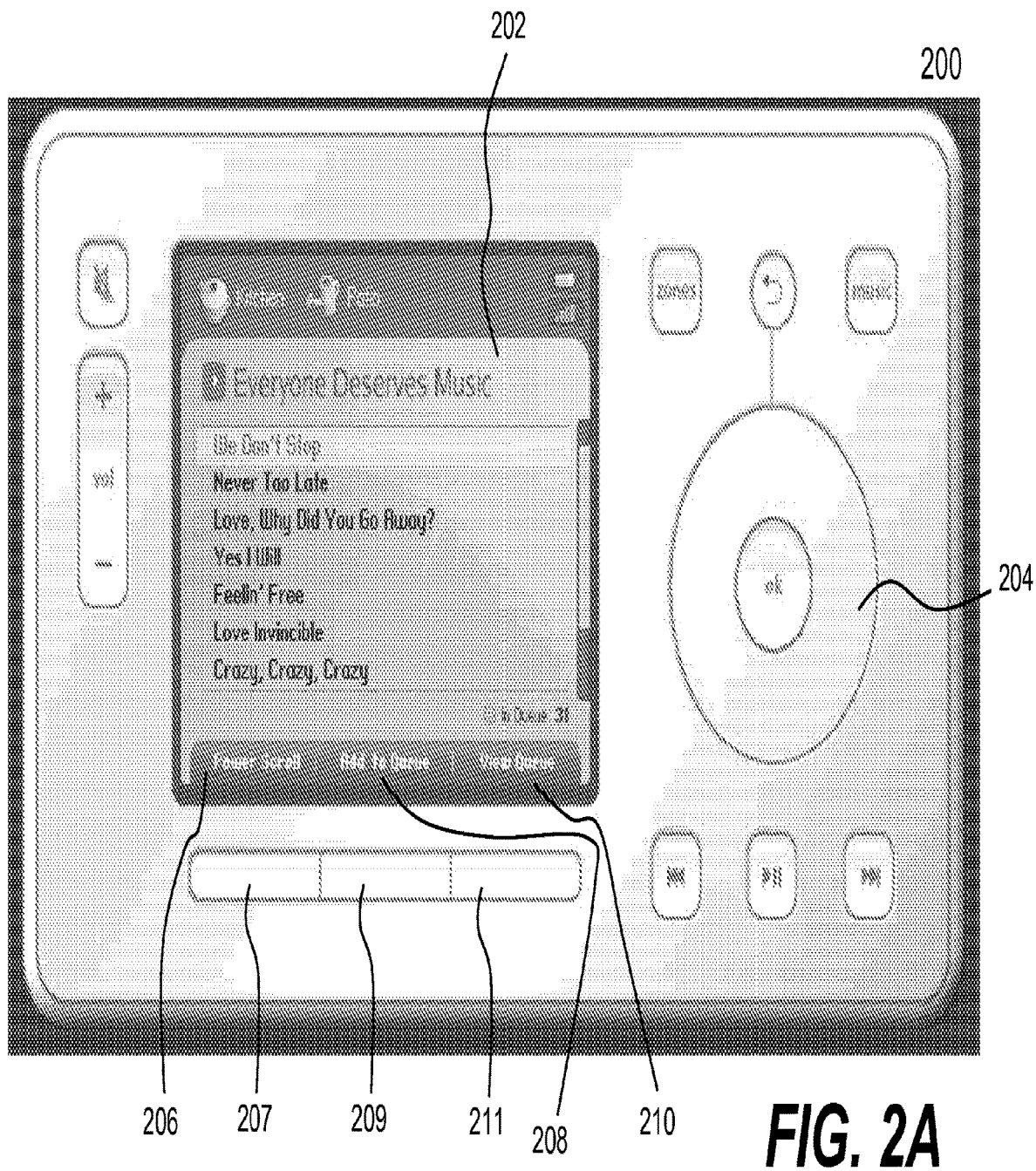
FIG. 2A shows an exemplary device in which the present invention is implemented according to one embodiment of the present invention.

FIG. 2A shows an exemplary device 200 in which the present invention is implemented according to one embodiment of the present invention. The device 200 includes a display screen 202 and a scroll wheel 204. Different from the device shown in FIG. 1, the display screen 202 includes a number of soft keys 206, 208, and 210 that can be respectively activated by buttons 207, 209, and 211. One of the soft keys 206 is labeled as "power scroll" that can be activated to start what is referred to herein as power scrolling. The soft key 206 may be activated by other means (e.g., touch screen). One of the features of the power scrolling is the underlying mechanism that provides a narrowed searching range from which a desired item may be readily located in a large list of items that may be provided locally or remotely.

Figure 2B:
FIG. 2B shows that, after the power scroll key is activated, a display, referred to herein as an indexing display, is popped up or displayed.

FIG. 2B shows that, after the power scroll key 206 is activated, a display 220, referred to herein as an indexing display, is popped up or displayed. As used herein, it is defined that a display screen or a screen is a physical display apparatus in a device, such as the display screen 202 of FIG. 2A, while a screen display or simply a display is an image presented on a display screen. According to one embodiment, the indexing display 220 is superimposed onto a displayed portion of a list of items. In another embodiment, the indexing display 220 is displayed on a side of a displayed portion of a list of items.

In any case, the indexing display 220 provides a list of indexes, each configured to cover a predefined range or a group of items sharing a common feature. As shown in the figure, the indexing display 220 shows a list of alphabets, each of the alphabets covers words or letters that begin with the corresponding alphabet. In operation, a user uses the scroll key 204 to scroll to a desired alphabet in the indexing display 220 that then leads to the beginning, middle or ending of a list of items that begin with the desired alphabet. As a result, a user does not have to scroll from the beginning of a list of items all the way to a desired item. With the power scrolling, the user now is able to "jump" to a right starting point and navigate in a much narrowed list for the desired item.

Figure 2C:
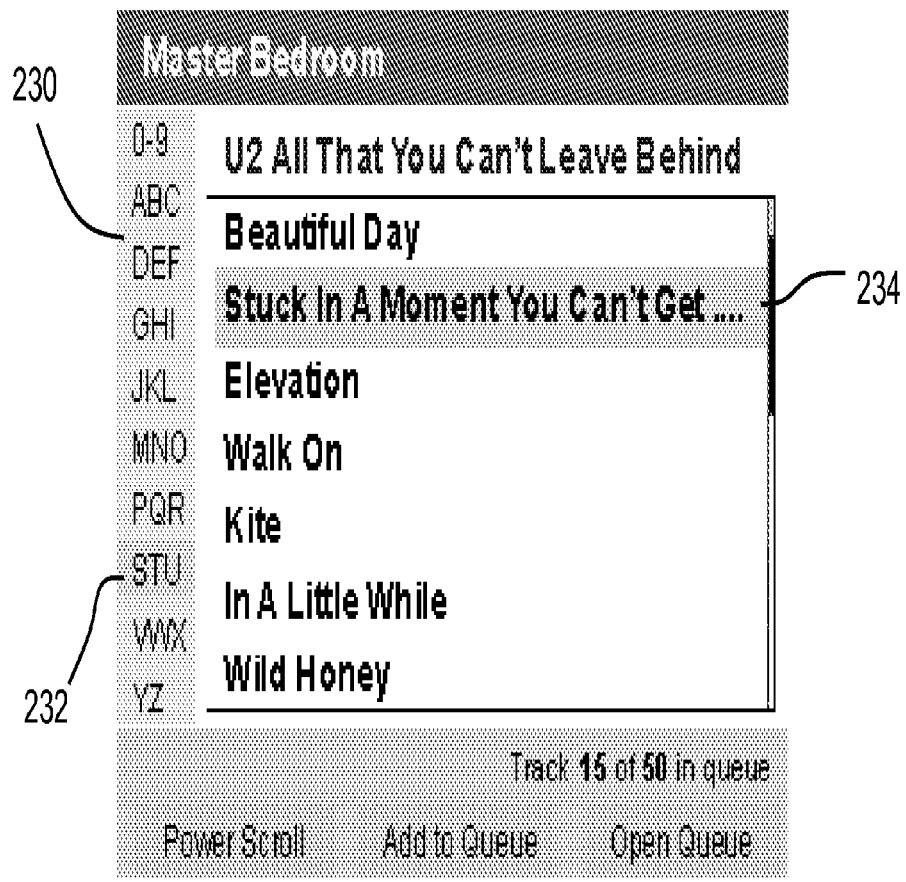
FIG. 2C shows another embodiment of the indexing display that shows a list of grouped indexes.

FIG. 2C shows another embodiment of the indexing display 230 that shows a list of grouped indexes. Instead of having one index for one type of items, one or more indexes are grouped as a grouped index such that all items in a list that begin with any index in one grouped index are associated with the grouped index. As shown in the figure, a grouped index "STU" 232 includes three characters and is selected, which leads to the beginning of items that are started with any of the characters "S", "T", and "U". As a result, a user does not have to go through items that begin with characters "A", "B", . . . or "R", and jump right into the items beginning with the characters "S", "T", or "U". In one embodiment in which the list is not sorted, as shown in FIG. 2C, the next item that the highlight 234 moves to is an item starting with any of the characters "S", "T", and "U". In other words, the scrolling bar 234 is configured to move either linearly or nonlinearly in accordance with a selection in the indexing display.

FIG. 2B and FIG. 2C show two examples of indexing characters. It should be noted that an indexing display is not necessary to display only the first character of a word, a phrase or a string. Depending on application, an article, such as "a" or "the" may not be indexed at all, in which case, a next word may be used for indexing purpose. It can also be appreciated that the power scrolling may be used in other categories. For example, a list of items may be organized in terms of characteristics, each of the characteristics is indexed by a label, or one or more of the characteristics are indexed by a grouped label. When the power scrolling is on, a set of desired characteristics in a long list can be readily located by the indexing display, where the indexing display provides a list of labels or grouped labels for limited scrolling.

According to one embodiment, a list of songs is organized in terms of genre (e.g., classic, jazz, Latin, pop, Rock . . . ). Each category may contain numerous songs. Going through the list all the way to a particular song in Rock can be tedious and experience the overshooting. With the power scrolling, the indexing display shows a list of the genre and provides means for jumping right into a desired category from which a desired song is readily located.

According to one embodiment, after an index is selected, an item highlighted in a list can be either a first one or a last one in the category or group indexed by the selected index. When the first one is highlighted in a display screen, a last item of a preceding group is also displayed in the display screen. When the last one is highlighted in a display screen, a first item of a following group is also displayed in the display screen.

Figure 3:
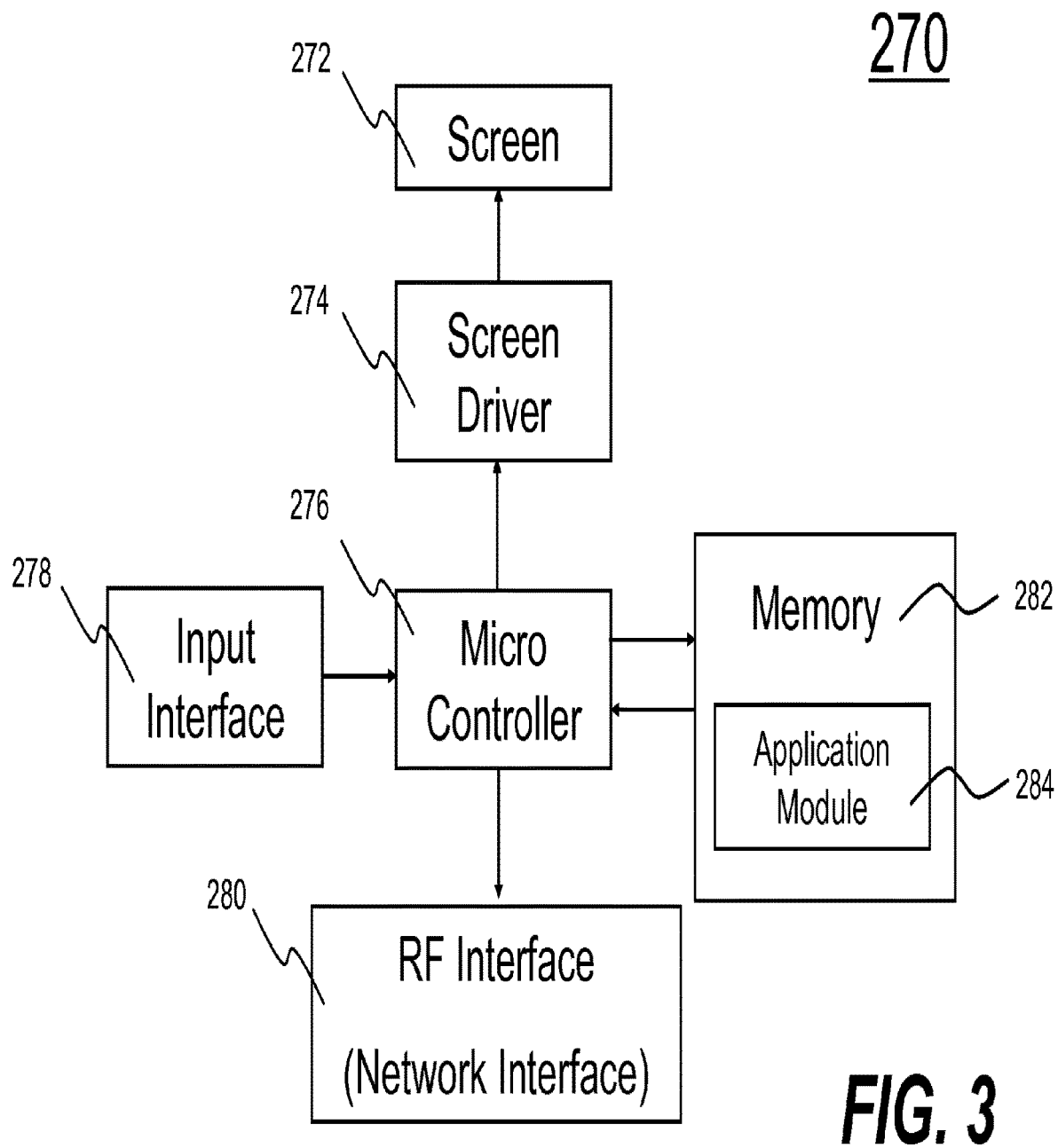
FIG. 3 illustrates an internal functional block diagram of an exemplary portable device.

The power scrolling may be implemented in a device with a display screen. FIG. 3 illustrates an internal functional block diagram of an exemplary controller 270. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module contemplating the power scrolling and enabling one or more soft keys is loaded in the memory 282.

The controller 270 includes a network interface 280 referred to as a RF interface 280 that facilitates wireless communication with another device being controlled by the controller 270 via a corresponding wireless interface or RF interface thereof.

Figure 4:
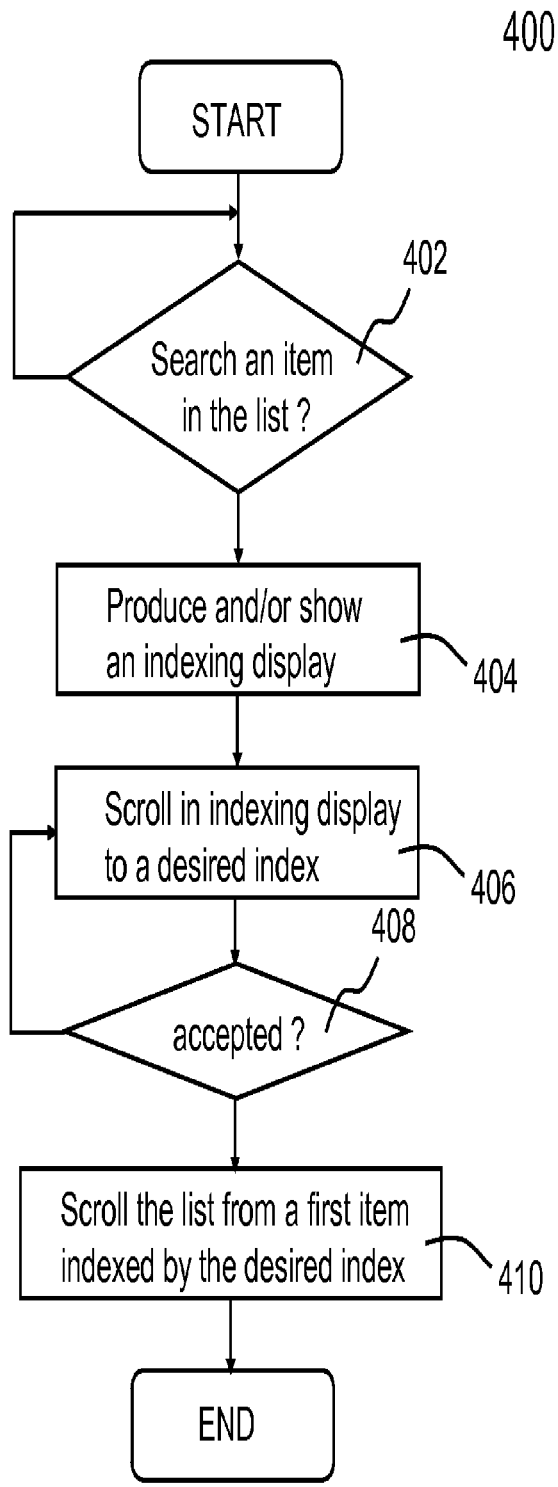
FIG. 4 shows a flowchart of scrolling a list of items in accordance with one embodiment of the present invention.

Referring now to FIG. 4, there shows a flowchart 400 of scrolling a list of items in accordance with one embodiment of the present invention. The flowchart 400 may be implemented in software, hardware or in a combination of both as a method, an apparatus or a part of a system. A list, typically containing many items, is displayed in a display screen. It can be appreciated to those skilled in the art that a list can be a collection of any items. To facilitate the understanding of the present invention, a list is considered a library of songs and each item is a song. The list is otherwise scrollable by a scroll wheel.

At 402, a user decides to look for an item in the list. Instead of starting scrolling the list, the user activates an indexing display that shows a list of indexes, each indexing a group of items that share one or more common features. In one example, the items in the group are all started with an identical character. In another example, the items in the group are started with one of limited number characters (e.g., three characters). In still another example, the items in the group belong to one category or kind.

In one embodiment, the list being displayed in an indexing display is pre-generated. If there is an index in the list that does not correspond to any item, an item that is closest to an item that would be otherwise indexed by the index is chosen. For example, an index "C" in the indexing display happens to be selected by a user while the underlying list does not have any items that are started with "C", in which case, either a last item in a group started with "B" or a first item in a group started with "D" is chosen. In another embodiment, the list being displayed in an indexing display is generated whenever this is an updated to the list of all items. At 406, the scroll wheel is associated with the indexing display such that the scrolling function now only applies to the indexing display. The user can quickly locate a desired index in the indexing display because the list in the indexing display is often short. At 408, if the located index is not the desired one, the process 400 goes back to 406 to allow the user continue looking for the desired one.

It is assumed that the located index is the desired one, the process 400 now goes to 410 where the scroll wheel is now associated with the list of all items. But the desired index brings a starting point right onto a very first item that is indexed by the desired index. From the starting point, the user can scroll the wheel to locate a desired item.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the power scrolling or the indexing display may be activated by means other than a soft key. When activated, multiple indexing displays may be displayed, provided that there are multiple indexing displays (e.g., one for one type of indexing). A scroll wheel is activated to scroll through the multiple indexing displays first before becoming associated with a selected indexing display. The power scrolling may also be automatically disabled when a list of items is short (e.g., less than 20 items or accommodative in a few displays). Accordingly, the scope of the present invention is defined by the appended claims rather than the forgoing description of embodiments.

What is claimed is:

1. Tangible, non-transitory computer-readable media comprising instructions encoded thereon, wherein the instructions, when executed by one or more processors, cause a computing device to perform a method comprising:
    displaying via a screen of the computing device, a first interface showing at least a portion of a list of items selectable for playback by at least one playback device separate from and controlled by the computing device;
    based on a first input via the first interface, displaying a second interface showing a plurality of indexes, each index comprising one or more characters corresponding to one or more shared characteristics of a first subset of items in the list of items, wherein at least a portion of the second interface is superimposed over at least a portion the first interface;
    receiving via the second interface, a second input indicating a selection of a first index of the plurality of indexes;
    in response to receiving the second input, displaying on the first interface, at least a portion of the first subset of items in the list of items, wherein the first subset of items corresponds to the first index; and
    displaying on the first interface, at least a portion of a second subset of items in the list of items, wherein the second subset of items corresponds to a second index of the plurality of indexes.

2. The tangible, non-transitory computer-readable media as recited in claim 1, wherein the method further comprises:
    prior to displaying the second interface, displaying on the first interface, a selectable icon to cause the second interface to be displayed, wherein the first input comprises a selection of the selectable icon.

3. The tangible, non-transitory computer-readable media as recited in claim 1, wherein the method further comprises:
    prior to displaying at least the portion of the second subset of items in the list of items, receiving via the first interface, a third input indicating a scroll through at least the portion of the first subset of items in the list of items displayed on the first interface, wherein displaying on the first interface, at least the portion of the second subset of items in the list of items comprises:
    based on the third input, displaying on the first interface, at least the portion of the second subset of items in the list of items.

4. The tangible, non-transitory computer-readable media as recited in claim 1, wherein the method further comprises:
    prior to displaying at least the portion of the second subset of items in the list of items, receiving via the second interface, a third input indicating a scroll through the plurality of indexes, wherein displaying on the first interface, at least the portion of the second subset of items in the list of items comprises:
    based on the third input, displaying on the first interface, at least the portion of the second subset of items in the list of items.

5. The tangible, non-transitory computer-readable media as recited in claim 1, wherein displaying on the first interface, at least a portion of a first subset of items in the list of items comprises:
    highlighting one of at least the portion of the first subset of items in the list of items.

6. The tangible, non-transitory computer-readable media as recited in claim 1, wherein the method further comprises:
in response to receiving the second input, highlighting the first index on the second interface.

7. The tangible, non-transitory computer-readable media as recited in claim 1, wherein the one or more shared characteristics comprises at least one of an artist, an album, a genre, and a beginning character of a track title.

8. A computing device comprising:
a screen;
a processor; and
tangible, non-transitory computer-readable storage media comprising instructions encoded thereon, wherein the instructions, when executed by the processor, cause the computing device to perform a method comprising:
displaying via the screen, a first interface showing at least a portion of a list of items selectable for playback by at least one playback device separate from and controlled by the computing device;
based on a first input via the first interface, displaying a second interface showing a plurality of indexes, each index comprising one or more characters corresponding to one or more shared characteristics of a first subset of items in the list of items, wherein at least a portion of the second interface is superimposed over at least a portion the first interface;
receiving via the second interface, a second input indicating a selection of a first index of the plurality of indexes; in response to receiving the second input, displaying on the first interface, at least a portion of the first subset of items in the list of items, wherein the first subset of items corresponds to the first index; and
displaying on the first interface, at least a portion of a second subset of items in the list of items, wherein the second subset of items corresponds to a second index of the plurality of indexes.

9. The computing device of claim 8, wherein the method further comprises:
prior to displaying the second interface, displaying on the first interface, a selectable icon to cause the second interface to be displayed, wherein the first input comprises a selection of the selectable icon.

10. The computing device of claim 8, wherein the method further comprises:
prior to displaying at least the portion of the second subset of items in the list of items, receiving via the first interface, a third input indicating a scroll through at least the portion of the first subset of items in the list of items displayed on the first interface, wherein displaying on the first interface, at least the portion of the second subset of items in the list of items comprises:
based on the third input, displaying on the first interface, at least the portion of the second subset of items in the list of items.

11. The computing device of claim 8, wherein the method further comprises:
prior to displaying at least the portion of the second subset of items in the list of items, receiving via the second interface, a third input indicating a scroll through the plurality of indexes, wherein displaying on the first interface, at least the portion of the second subset of items in the list of items comprises:
based on the third input, displaying on the first interface, at least the portion of the second subset of items in the list of items.

12. The computing device of claim 8, wherein displaying on the first interface, at least a portion of a first subset of items in the list of items comprises:
highlighting one of at least the portion of the first subset of items in the list of items.

13. The computing device of claim 8, wherein the method further comprises:
in response to receiving the second input, highlighting the first index on the second interface.

14. The computing device of claim 8, wherein the one or more shared characteristics comprises at least one of an artist, an album, a genre, and a beginning character of a track title.

15. A method performed by a computing device, the method comprising:
displaying via a screen, a first interface showing at least a portion of a list of items selectable for playback by at least one playback device separate from and controlled by the computing device;
based on a first input via the first interface, displaying a second interface showing a plurality of indexes, each index comprising one or more characters corresponding to one or more shared characteristics of a first subset of items in the list of items, wherein at least a portion of the second interface is superimposed over at least a portion the first interface;
receiving via the second interface, a second input indicating a selection of a first index of the plurality of indexes;
in response to receiving the second input, displaying on the first interface, at least a portion of the first subset of items in the list of items, wherein the first subset of items corresponds to the first index; and
displaying on the first interface, at least a portion of a second subset of items in the list of items, wherein the second subset of items corresponds to a second index of the plurality of indexes.

16. The method of claim 15, further comprising:
prior to displaying the second interface, displaying on the first interface, a selectable icon to cause the second interface to be displayed, wherein the first input comprises a selection of the selectable icon.

17. The method of claim 15, further comprising prior to displaying at least the portion of the second subset of items in the list of items, receiving via the first interface, a third input indicating a scroll through at least the portion of the first subset of items in the list of items displayed on the first interface, wherein displaying on the first interface, at least the portion of the second subset of items in the list of items comprises:
based on the third input, displaying on the first interface, at least the portion of the second subset of items in the list of items.

18. The method of claim 15, further comprising prior to displaying at least the portion of the second subset of items in the list of items, receiving via the second interface, a third input indicating a scroll through the plurality of indexes, wherein displaying on the first interface, at least the portion of the second subset of items in the list of items comprises:
based on the third input, displaying on the first interface, at least the portion of the second subset of items in the list of items.

19. The method of claim 15, wherein displaying on the first interface, at least a portion of a first subset of items in the list of items comprises:
highlighting one of at least the portion of the first subset of items in the list of items.

20. The method of claim 15, further comprising:
in response to receiving the second input, highlighting the first index on the second interface.

\* \* \* \* \*